(12) United States Patent
Yamayose

(10) Patent No.: US 9,499,442 B1
(45) Date of Patent: Nov. 22, 2016

(54) METHOD FOR MANUFACTURING ALUMINUM-TITANATE-BASED CERAMIC HONEYCOMB STRUCTURE

(71) Applicant: Ibiden Co., Ltd., Ogaki-shi (JP)

(72) Inventor: Kazunori Yamayose, Stuttgart (DE)

(73) Assignee: IBIDEN CO., LTD., Ogaki-shi (JP)

( * ) Notice: Subject to any disclaimer, the term of this patent is extended or adjusted under 35 U.S.C. 154(b) by 0 days.

(21) Appl. No.: 13/873,379

(22) Filed: Apr. 30, 2013

Related U.S. Application Data

(60) Provisional application No. 61/787,439, filed on Mar. 15, 2013.

(51) Int. Cl.
| | |
|---|---|
| *B01D 53/94* | (2006.01) |
| *B29D 99/00* | (2010.01) |
| *B28B 1/00* | (2006.01) |
| *B01D 46/24* | (2006.01) |
| *C04B 38/00* | (2006.01) |

(52) U.S. Cl.
CPC ............................... *C04B 38/0006* (2013.01)

(58) Field of Classification Search
CPC . B28B 11/006; B01D 46/2418; Y10S 55/05; F26B 2210/02; B24B 9/06
USPC ............ 264/630, 631, 632, 634, 176.1, 40.6
See application file for complete search history.

(56) References Cited

U.S. PATENT DOCUMENTS

| | | | | |
|---|---|---|---|---|
| 4,293,357 A | * | 10/1981 | Higuchi et al. ............ 156/89.22 | |
| 4,455,180 A | * | 6/1984 | Hillman et al. ................ 264/631 | |
| 5,188,779 A | * | 2/1993 | Horikawa ............... B28B 3/269 | |
| | | | | 264/630 |
| 5,763,344 A | * | 6/1998 | Komatsu ............... C04B 35/581 | |
| | | | | 264/681 |
| 5,766,393 A | * | 6/1998 | Nishimura et al. ......... 156/89.22 | |
| 6,680,101 B1 | * | 1/2004 | Kato .................... B01J 37/0018 | |
| | | | | 264/630 |
| 6,809,139 B2 | * | 10/2004 | Fabian .................. C04B 35/195 | |
| | | | | 264/42 |
| 7,326,271 B2 | * | 2/2008 | Kasai et al. .................... 55/523 | |
| 7,517,279 B2 | * | 4/2009 | Kober et al. .................. 454/155 |

(Continued)

FOREIGN PATENT DOCUMENTS

| | | | | |
|---|---|---|---|---|
| JP | 2012-91368 A | | 5/2012 | |
| WO | WO2007/019801 | * | 2/2007 | ............ B01D 46/00 |
| WO | WO2008044508 | * | 4/2008 | ......... B01D 46/0001 |

OTHER PUBLICATIONS

U.S. Appl. No. 13/887,638, filed May 6, 2013, Yamayose.

(Continued)

*Primary Examiner* — Nahida Sultana
(74) *Attorney, Agent, or Firm* — Oblon, McClelland, Maier & Neustadt, L.L.P.

(57) ABSTRACT

A method for manufacturing a ceramic honeycomb structure includes kneading titania particles, alumina particles and binder ingredient such that raw material paste including the titania particles, alumina particles and binder ingredient is prepared, forming a body made of the paste and having a honeycomb structure such that the body has the honeycomb structure having through-holes extending in the longitudinal direction of the body and partitions formed between the through-holes, sintering the body made of the paste such that a ceramic body having the honeycomb structure is formed, applying sealant to either end of each through-hole of the ceramic body such that each through-hole of the ceramic body is sealed at one end, and heating the sealant sealing one end of each through-hole such that the ceramic body having cured sealant at one end of each through-hole in the honeycomb structure is formed.

20 Claims, 7 Drawing Sheets

(56) References Cited

U.S. PATENT DOCUMENTS

| | | | |
|---|---|---|---|
| 7,611,560 B2* | 11/2009 | Ichikawa | 55/523 |
| 7,691,167 B2* | 4/2010 | Tokumaru | 55/523 |
| 7,727,451 B2* | 6/2010 | Naruse et al. | 264/296 |
| 7,833,606 B2* | 11/2010 | Suwabe et al. | 428/116 |
| 7,842,227 B2* | 11/2010 | Kasai et al. | 264/605 |
| 8,114,184 B2* | 2/2012 | Chen et al. | 55/523 |
| 8,398,797 B2* | 3/2013 | Okazaki | B01D 46/0001 156/89.22 |
| 2002/0175451 A1* | 11/2002 | Vance et al. | 264/631 |
| 2005/0161849 A1* | 7/2005 | Ohno | B22F 3/11 264/43 |
| 2006/0192324 A1* | 8/2006 | Kaneda et al. | 264/630 |
| 2007/0105707 A1* | 5/2007 | Ichikawa | 501/141 |
| 2007/0111069 A1* | 5/2007 | Rehg | C04B 37/005 429/465 |
| 2007/0262497 A1* | 11/2007 | Yamamura | B28B 11/006 264/630 |
| 2008/0176028 A1* | 7/2008 | Ohno et al. | 428/116 |
| 2009/0199953 A1* | 8/2009 | Sato | 156/89.22 |
| 2009/0249579 A1* | 10/2009 | Aramaki et al. | 15/405 |
| 2010/0310819 A1* | 12/2010 | Suwabe et al. | 428/116 |
| 2011/0262311 A1* | 10/2011 | Schumann | B01D 46/2418 422/177 |
| 2012/0306123 A1* | 12/2012 | Maurey et al. | 264/494 |
| 2013/0106031 A1* | 5/2013 | Boger et al. | 264/631 |
| 2013/0207323 A1* | 8/2013 | Uoe | 264/630 |
| 2013/0269303 A1* | 10/2013 | Uoe et al. | 55/523 |
| 2014/0103560 A1* | 4/2014 | Okazaki | 264/43 |
| 2015/0050451 A1* | 2/2015 | Yamayose | 428/117 |

OTHER PUBLICATIONS

U.S. Appl. No. 13/872,483, filed Apr. 29, 2013, Yamayose.
U.S. Appl. No. 13/873,576, filed Apr. 30, 3013, Yamayose.
U.S. Appl. No. 13/887,688, filed May 6, 2013, Yamayose.
U.S. Appl. No. 13/873,624, filed Apr. 30, 2013, Yamayose.
U.S. Appl. No. 13/873,763, filed Apr. 30, 2013, Yamayose.
U.S. Appl. No. 13/873,933, filed Apr. 30, 2013, Yamayose.

* cited by examiner

Cross-sectional view at line (A-A)

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,439, filed Mar. 15, 2013, the entire contents of which are incorporated herein by reference.

BACKGROUND OF THE INVENTION

Field of the Invention

The present invention relates to a method for manufacturing an aluminum-titanate-based ceramic honeycomb structural body. More specifically, the present invention relates to a method for manufacturing a sealed body.

Description of Background Art

The method for manufacturing a honeycomb structure described in Japanese Laid-Open Patent Publication No. 2012-91368 includes the following: a step for preparing raw material slurry; a sealing step for forming sealed portions by injecting droplets of the raw material slurry into portions of a honeycomb body to be sealed using an inkjet method; a degreasing step for degreasing the sealed honeycomb structure after the sealing step; and a sintering step. The entire contents of this publication are incorporated herein by reference.

SUMMARY OF THE INVENTION

According to one aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partition portions formed between the through-holes, sintering the body made of the raw material paste and having the honeycomb structure such that a ceramic body having the honeycomb structure is formed, applying a sealant to either end of each of the through-holes of the ceramic body in the longitudinal direction such that each of the through-holes of the ceramic body is sealed at one end, and heating the sealant sealing one end of each of the through-holes of the ceramic body such that the ceramic body having a cured sealant at one end of each of the through-holes in the honeycomb structure is formed.

Another aspect of the present invention is a ceramic honeycomb structural body produced by a method including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partition portions formed between the through-holes, sintering the body made of the raw material paste and having the honeycomb structure such that a ceramic body having the honeycomb structure is formed, applying a sealant to either end of each of the through-holes of the ceramic body in the longitudinal direction such that each of the through-holes of the ceramic body is sealed at one end, and heating the sealant sealing one end of each of the through-holes of the ceramic body such that the ceramic body having a cured sealant at one end of each of the through-holes in the honeycomb structure is formed.

According to yet another aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, semisintering the body made of the raw material paste and having the honeycomb structure such that a semisintered body having the honeycomb structure is formed, applying a sealant to either end of each of the through-holes of the semisintered body in the longitudinal direction such that each of the through-holes of the semisintered body is sealed at one end, and sintering the semisintered body having the sealant sealing one end of each of the through-holes of the semisintered body such that a ceramic body having a sintered sealant at one end of each of the through-holes in the honeycomb structure is formed.

Still another aspect of the present invention is a ceramic honeycomb structural body produced by a method including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, semisintering the body made of the raw material paste and having the honeycomb structure such that a semisintered body having the honeycomb structure is formed, applying a sealant to either end of each of the through-holes of the semisintered body in the longitudinal direction such that each of the through-holes of the semisintered body is sealed at one end, and sintering the semisintered body having the sealant sealing one end of each of the through-holes of the semisintered body such that a ceramic body having a sintered sealant at one end of each of the through-holes in the honeycomb structure is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
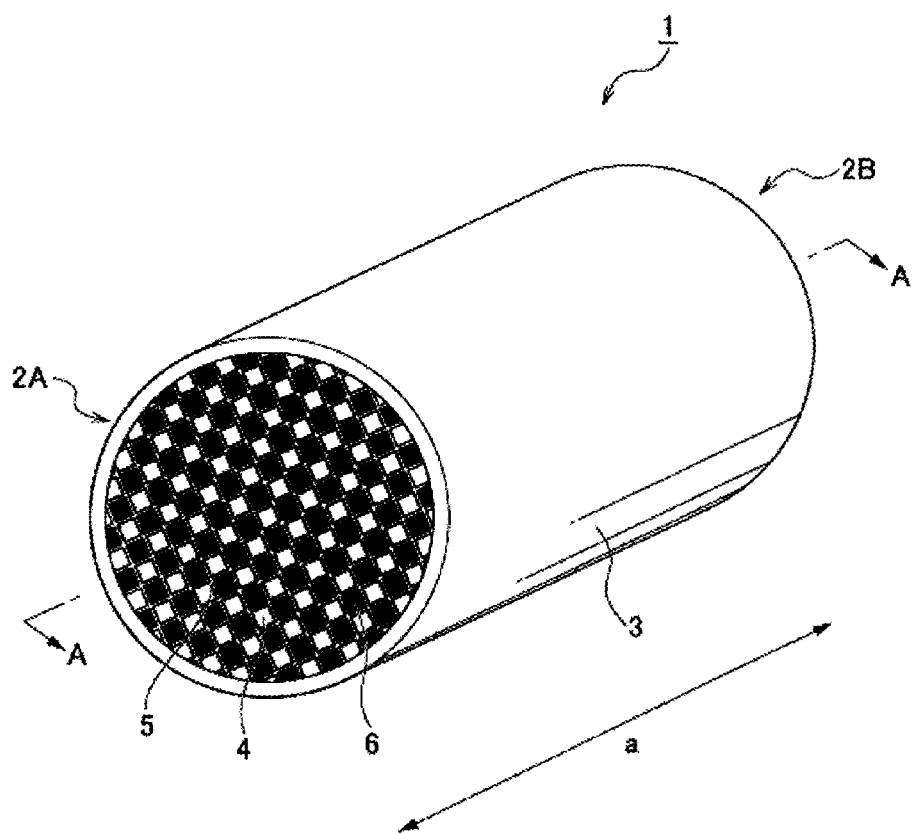
FIG. 1 is a perspective view schematically showing an example of a ceramic honeycomb structural body obtained by a manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic honeycomb structural body obtained by a manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealing pattern.

The shape of ceramic body 1 may also be an elliptic cylinder, a rectangular prism or a polygonal prism instead of a circular cylinder as shown in FIG. 1.

Figure 2:
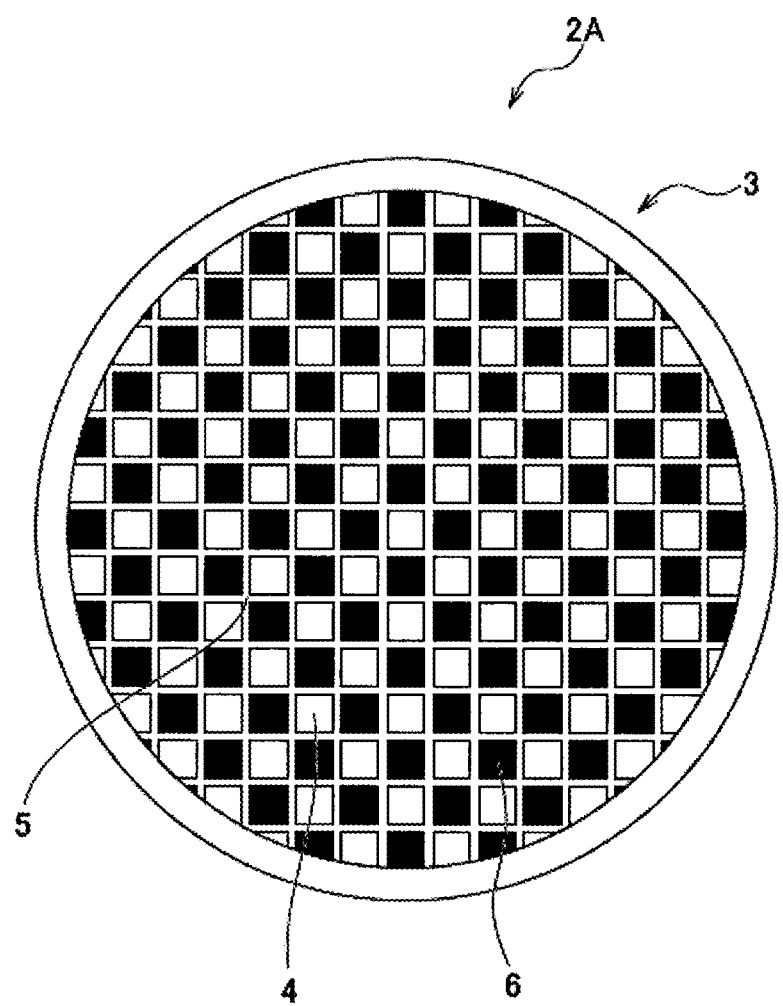
FIG. 2 is a view showing an end surface of the ceramic honeycomb structural body shown in FIG. 1.

FIG. 2 is a view showing an end surface of ceramic honeycomb structural body 1 shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
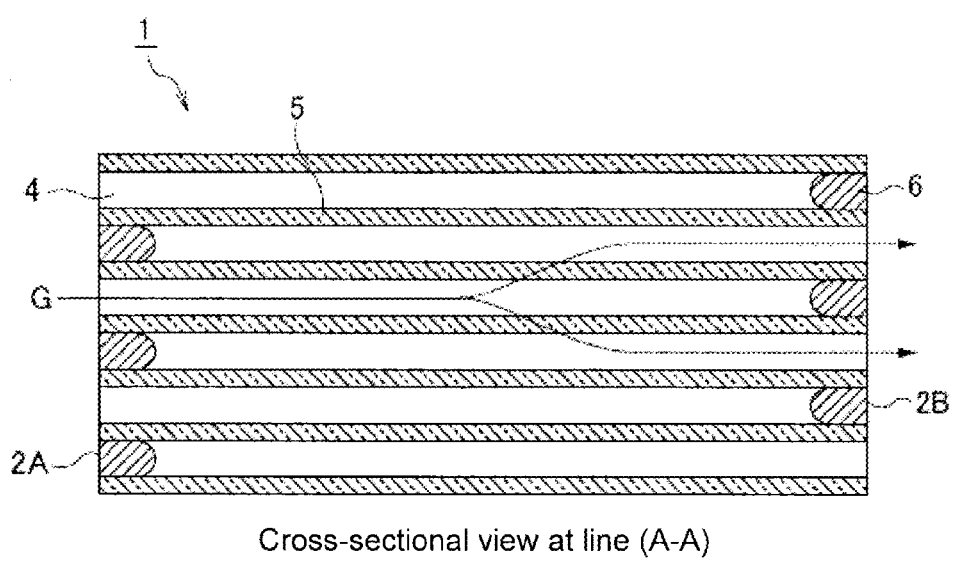
FIG. 3 is a cross-sectional view at line (A-A) of the ceramic honeycomb structural body shown in FIG. 1.

FIG. 3 is a cross-sectional view at line (A-A) of the ceramic honeycomb structural body shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic honeycomb structural body 1 according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to an embodiment of the present invention.

Figure 4:
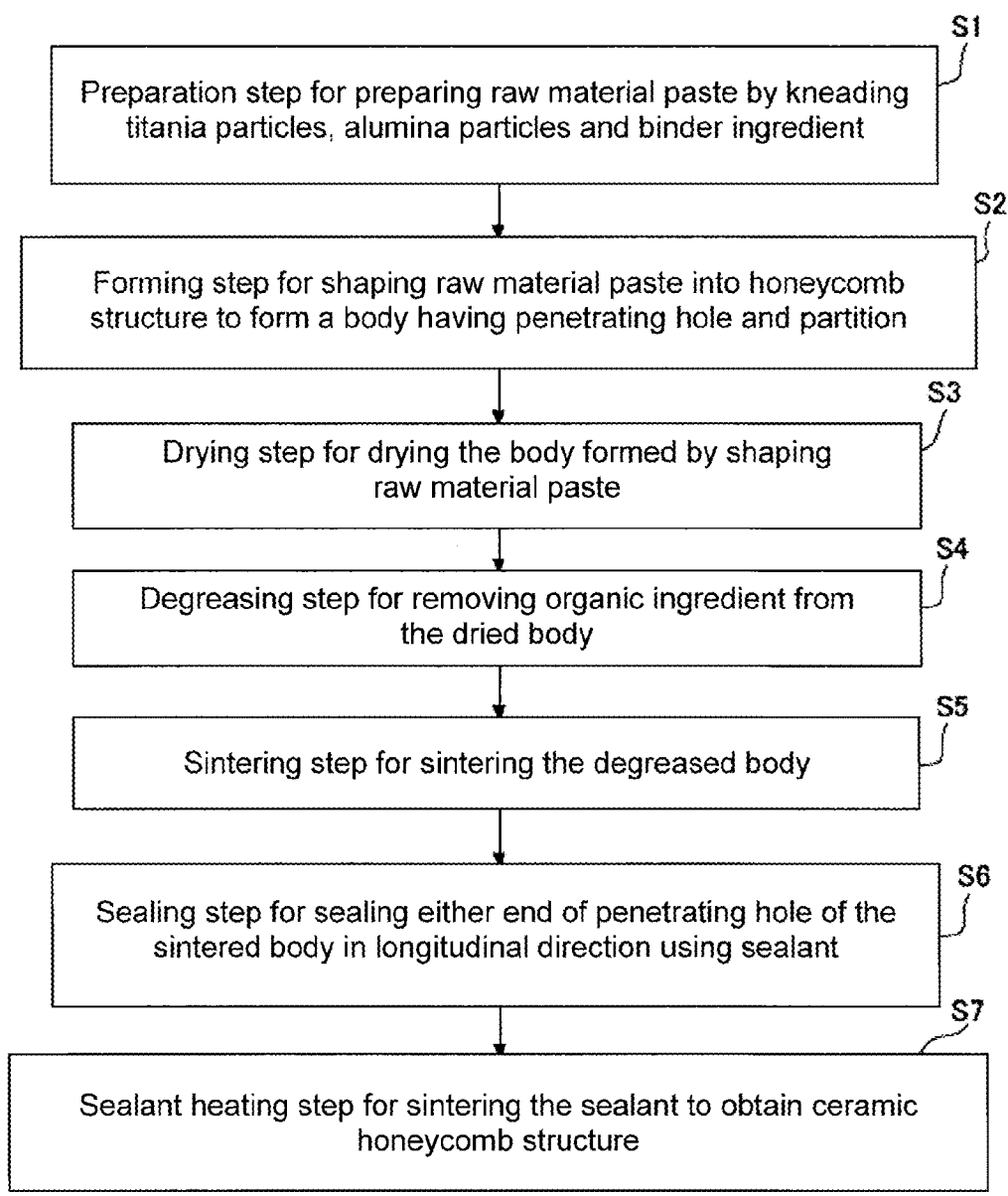
FIG. 4 is a flowchart showing an example of the manufacturing method according to a first embodiment of the present invention.

FIG. 4 is a flowchart showing an example of the method for manufacturing a honeycomb structure according to a first embodiment of the present invention.

As shown in FIG. 4, following is an example of a method for manufacturing a ceramic honeycomb structure according to the first embodiment of the present invention: preparation step (S1) for preparing raw material paste by kneading titania particles, alumina particles and a binder ingredient; forming step (S2) for shaping the raw material paste into a honeycomb structure to form a body having through-holes and partitions; drying step (S3) for drying a body shaped from the raw material paste; degreasing step (S4) for removing organic ingredients from the dried body; sintering step (S5) for sintering the degreased body; sealing step (S6) for sealing either end of a through-hole of the sintered body in a longitudinal direction using a sealant; and sealant heating step (S7) to obtain a ceramic honeycomb structure by sintering the sealant.

However, it is not always necessary to conduct drying step (S3) and sealing step (S4) in the method for manufacturing a ceramic honeycomb structure.

Following are steps to be included when manufacturing a ceramic honeycomb structure: sintering step (S5) for sintering a degreased body; sealing step (S6) for sintering either end of a through-hole of the sintered body in a longitudinal direction using a sealant; and sealant heating step (S7) for sintering the sealant used to seal either end of a through-hole of the sintered body in a longitudinal direction.

By conducting such steps, the difference is reduced between the diameter at both ends of a ceramic body in a longitudinal direction and the diameter in its central portion. Also, when a method for manufacturing a ceramic honeycomb structure includes degreasing step (S4), the body is sufficiently degreased without setting a higher temperature or a longer duration for degreasing.

In the following, each step is described.

Preparation of Raw Material Paste (S1)

In a preparation step, raw material paste is prepared by kneading titania particles, alumina particles and a binder ingredient. Also, raw material paste may be prepared by kneading titania particles, alumina particles, mullite particles and a binder ingredient.

In the present application, titania particles indicate those containing only titania, and alumina particles indicate those containing only alumina. Mullite particles mean particles formed with alumina components and silicon dioxide components. Here, titania particles, alumina particles and mullite particles may also contain impurities. As for impurities, for example, silicon (Si), aluminum (Al), iron (Fe), calcium (Ca), magnesium (Mg), potassium (K), sodium (Na) and the like are listed.

A method for kneading particles and a binder ingredient is not limited specifically, and a mixer, a kneader, a media mixing mill (attritor), a pressure kneader (muller) or the like may be used for kneading.

Titania particles and alumina particles may be used as is, or they may be slurried using a dispersion medium such as water. Alternatively, mixed particles of titania particles and alumina particles may also be used as described later. In addition, mullite particles may be added to titania particles and alumina particles.

As for titania particles and alumina particles used in the preparation step, it is an option to use a precursor in which titania particles and alumina particles are combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. An amount-of-substance ratio here means a ratio of the amount of substance of titania to the amount of substance of alumina, not a ratio of the amount of substance of titania particles to the amount of substance of alumina particles. Therefore, when mullite particles or the like are used when forming a precursor, an amount-of-substance ratio of titania to alumina is obtained based on the sum (amount of substance of alumina) of alumina derived from alumina particles and alumina derived from mullite particles. Accordingly, when mullite particles are used in the preparation step, it is preferred to combine mullite particles with titania particles and alumina particles in an amount-of-substance ratio of titania to alumina that is within the above range.

When titania particles and alumina particles are combined in a preparation step or a preconditioning treatment step, their weight ratio is, for example, in a range of 35:65~55:45, more preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

When alumina particles are used with titania particles having a particle diameter greater than that of alumina particles, it is referred to as a "first mode" in the following. In addition, when alumina particles are used with titania particles having a particle diameter smaller than that of alumina particles, it is referred to as a "second mode" and described below. Moreover, when alumina particles are used with titania particles having a particle diameter substantially the same as that of alumina particles, it is referred to as a "third mode" and described below.

As for the particle diameter of titania particles in the first mode, the mean volume particle diameter is 5 μm~20 μm, for example. Also, particles with a mean volume particle diameter of 8 μm~18 μm or the like may be used. Here, it is an option to use primary particles of titania particles, secondary particles which are aggregate primary particles, or a combination thereof.

In the present application, mean volume particle diameters are measured using a laser diffraction particle size distribution analyzer (Beckman Coulter Inc.).

As for the particle diameter of alumina particles in the first mode, the mean volume particle diameter is 2 μm~5 μm, for example.

In the present application, the type of alumina particles is not limited specifically. For example, α-alumina particles, γ-alumina particles, a combination of α-alumina particles and γ-alumina particles, or the like may be used. In addition, alumina particles may be primary particles, secondary particles that are aggregate primary particles, or a combination thereof.

In the first mode, the ratio of particle diameters of titania particles and alumina particles is not limited specifically, and it may be in a range of 10:1~10:3, for example.

A second mode is described in the following, using alumina particles and titania particles having a smaller particle diameter than alumina particles.

As for the particle diameter of titania particles in the second mode, the mean volume particle diameter is 0.1 μm~0.8 μm or 0.2 μm~0.5 μm, for example.

As for the particle diameter of alumina particles in the second mode, the mean volume particle diameter is 2 μm~5 μm, for example.

In the second mode, the ratio of particle diameters of titania particles and alumina particles is not limited specifically, and it may be in a range of 1:4~1:10, for example.

Furthermore, a third mode is described, using titania particles and alumina particles having substantially the same particle diameters as each other.

As for the particle diameter of titania particles in the third mode, the mean volume particle diameter is 1 μm~5 μm or 1 μm~3 μm, for example.

As for the particle diameter of alumina particles in the third mode, the mean volume particle diameter is 2 μm~5 μm, for example.

In the third mode, the ratio of particle diameters of titania particles to alumina particles is not limited specifically, and it may be in a range of 1.0:0.3~1:4, for example.

As for the particle diameter of mullite particles to be used in addition to titania particles and alumina particles if necessary, the mean volume particle diameter is 0.1 μm~45 μm, for example. Alternatively, a mean volume particle diameter of 0.1 μm~20 μm, 0.5 μm~10 μm and so forth, for example, may also be used. When a body is sintered and aluminum titanate is formed, unreacted aluminum and silicon contained in mullite particles are thought to melt and work as a binder which fills spaces in aluminum titanate.

The mullite particles may be primary particles, secondary particles which are aggregate primary particles, or a combination thereof.

For forming a precursor in the present embodiment, the powder of titania particles (titania powder) containing titania particles may include impurities such as silicon (Si), aluminum (Al), iron (Fe), calcium (Ca), magnesium (Mg), potassium (K) and sodium (Na). In the present application, "titania particle powder" means bulk (material, raw material) of titania particles to be used in a method for manufacturing a ceramic honeycomb structure. Here, impurities in titania powder may be such that are contained inevitably during a process of manufacturing titania, or may be such that are mixed into titania powder separately. In addition to impurities that make solid solutions with titania particles, other impurities that are present outside titania particles of titania powder may also be included.

It is thought that those impurities contribute to suppressing aluminum titanate, which is produced using titania particles and alumina particles, from being decomposed into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing synthesized titania by using acids, alkalis or the like.

The amount of iron in titania powder is preferred to be at a weight ratio of 200 ppm~1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from being decomposed into titania and alumina in a high temperature range.

The amount of silicon contained in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Si^{4+}$ is suppressed from being decomposed into titania and alumina in a high temperature range.

No magnesium is preferred to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought that MgO may cause cracking due to expansion from moisture absorption. Thus, the amount of magnesium in titania powder is preferred to be within the above range. Alternatively, it is preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering additives for sinter bonding aluminum titanate particles to each other so as to suppress cracking at particle boundaries among aluminum titanate particles. Thus, the amounts of potassium and sodium in titania powder are preferred to be in the above ranges.

Specifically, mixed particles of titania particles and alumina particles, or mixed particles of titania particles, alumina particles and mullite particles are formed by the following preconditioning treatment step.

Preconditioning Treatment

Titania particles and alumina particles are brought into contact and adhered to each other to form a precursor (a particle contact body of titania particles and alumina particles) in a preconditioning treatment step. Accordingly, a precursor is obtained where titania particles and alumina particles are in contact with each other in a homogeneously dispersed state.

In a preconditioning treatment step, a precursor may also be formed by further adding a sintering additive and bringing it into contact with titania particles and alumina particles (particle contact body of titania particles, alumina particles and a sintering additive). As for sintering additives, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. As described above, an amount-of-substance ratio here means a ratio of the amount of substance of titania to the amount of substance of alumina, not a ratio of the amount of substance of titania particles to the amount of substance of alumina particles. Therefore, when mullite particles or the like are used when forming a precursor, an amount-of-substance ratio of titania to alumina is obtained based on the sum (amount of substance of alumina) of alumina derived from alumina particles and alumina derived from mullite particles.

In the first mode above, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed into an oscillating granulator and then put into a rolling motion to prepare a precursor; titania particles and water are placed into an oscillating granulator and put into a rolling motion, then alumina particles are added to the oscillating granulator and put into a rolling motion so that a precursor is prepared; and so forth. In such cases, a ratio of 5~10% by mass of water based on the entire mass of titania particles is used. Moreover, it is an option to use a binder ingredient (such as methylcellulose) along with water. A ratio of 5~10% by mass of a binder ingredient based on the entire mass of titania particles may be used.

As for a method in which titania particles are immersed in an aqueous dispersion of alumina particles, for example, alumina particles are dispersed in a dispersion medium such as water to form an aqueous dispersion of alumina particles, titania particles are immersed in the aqueous dispersion of alumina particles, and then a precursor, in which titania particles and alumina particles are homogenized and in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

In the first mode, by conducting preconditioning treatment step, it is easier to form a precursor where multiple alumina particles make contact with the surface of a titania particle using alumina particles and titania particles whose particle diameter is greater than that of alumina particles.

In addition, to bring titania particles and alumina particles into contact with each other in the second mode above, the following may be employed, for example: a method in which a mixture containing titania particles and alumina particles is spray-dried; a method in which titania particles and alumina particles are granulated through a rolling motion; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed. As for a method for granulating titania particles and alumina particles through a rolling motion, a precursor may also be prepared when alumina particles and water are placed into an oscillating granulator, put into a rolling motion, and then titania particles are added into the oscillating granulator and put into a rolling motion.

In the second mode, by conducting preconditioning treatment step, it is easier to form a precursor where titania particles make contact with the surface of an alumina particle.

Furthermore, to bring titania particles and alumina particles into contact with each other in the third mode, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed.

In the third mode, when a preconditioning treatment step is conducted using titania particles and alumina particles having substantially the same particle diameter as each other, that makes it easier to form a mixture of a precursor where multiple alumina particles are in contact with the surface of a titania particle, a precursor where multiple titania particles are in contact with the surface of an alumina particle, and the like.

In a preconditioning treatment step, the precursor is not sintered directly after the preconditioning treatment step. It is thought to be easier to form a precursor with a uniform particle diameter and to knead the precursor and a binder ingredient for a short duration.

By doing such a preconditioning treatment step, titania particles and alumina particles are more likely to come in contact with each other. Accordingly, precursor 7 is formed, where alumina particles 9 make contact with titania particle 8 to cover its surface, for example (FIG. 6).

Figure 6:
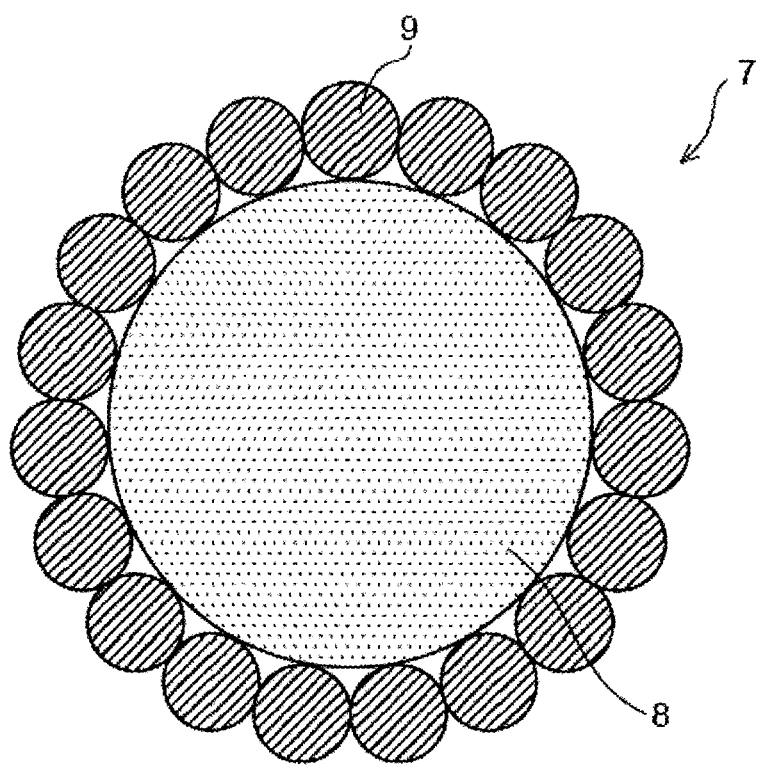
FIG. 6 is a view schematically showing an example of a titania particle and alumina particles.

FIG. 6 shows a state where titania particle 8 is covered with alumina particles 9. That is an example of a precursor. Here, the state of a precursor is not limited to such a size relationship between titania particles and alumina particles as shown in FIG. 6, and another state, where the size of alumina particles is greater than that of titania particles and the surface of an alumina particle is covered with titania particles, may be employed. In addition, yet another state, where the size of titania particles is substantially the same as that of alumina particles, may also be employed.

Figure 7:
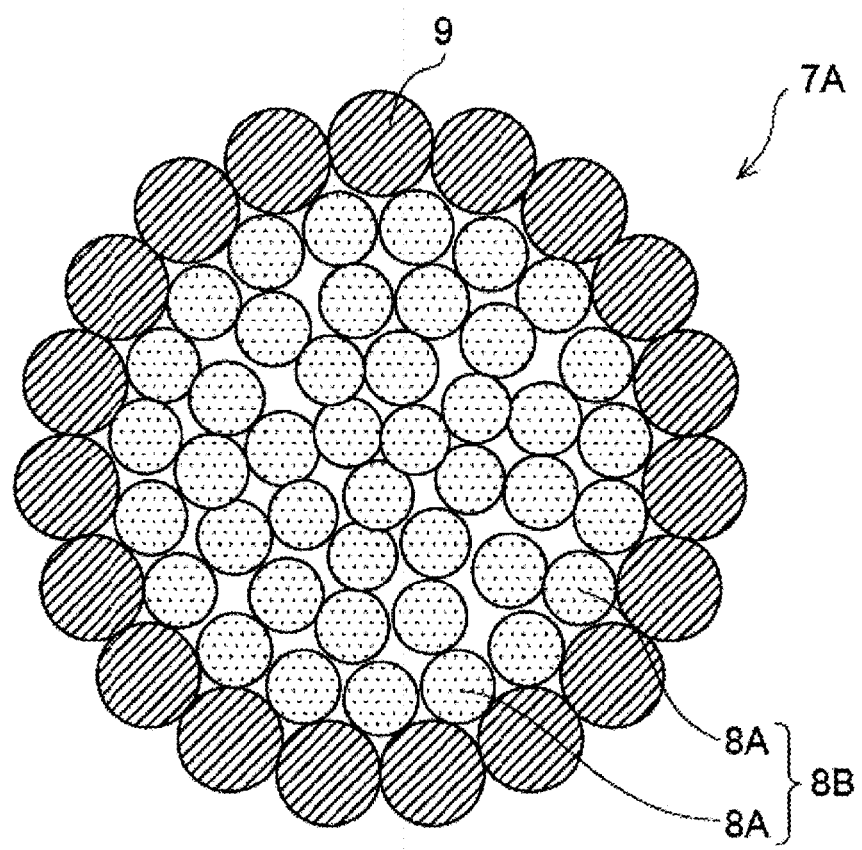
FIG. 7 is a view schematically showing another example of a precursor made of titania particles and alumina particles in an embodiment of the present invention.

Also, when an aggregate of primary particles is used for titania particles, titania particles and alumina particles are more likely to come in contact with each other by performing a preconditioning treatment step as described above. For example, as shown in FIG. 7, a precursor (7A) is formed, where titania particles (secondary particles) (8B) made of aggregate titania particles (primary particles) (8A) are covered with alumina particles 9.

In the present application, a "precursor" means a granular substance where titania particles and alumina particles make contact and adhere to each other.

When titania particles, alumina particles and mullite particles make contact and adhere to each other, a precursor (a particle contact body of titania particles, alumina particles and mullite particles) is formed by the same method described above for bringing titania particles and alumina particles into contact with each other.

To bring titania particles, alumina particles and mullite particles into contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed.

As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, the following are listed, for example: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be added is 0.1%~50% by mass. It may be 10%~40% by mass.

Forming of Honeycomb Structural Body (S2)

In a forming step, a body is formed by shaping the raw material paste into a honeycomb structure.

Forming raw material paste into a shape is not limited to any specific method, and extrusion through a honeycomb die, injection, pressing or the like may be employed.

Drying of Body Shaped from Raw Material Paste (S3)

In a drying step, a body shaped from the raw material paste is dried.

Dryers for a drying step are not limited to any specific type, and the following are listed: microwave dryers, hot-air dryers, dielectric heating dryers, reduced-pressure dryers, vacuum dryers, freeze dryers and the like.

The duration and temperature for drying are set appropriately according to the volume or the like of a honeycomb body shaped from the raw material paste.

Degreasing of Honeycomb Structural Body (S4)

In a degreasing step, organic ingredients are removed from the sealed body.

Conditions for removing organic ingredients from a dried body are not limited specifically, and may be selected according to the type and amount of organic ingredients contained in the honeycomb body. For example, degreasing is conducted at 150° C.~800° C. for two to four hours.

Sintering of Honeycomb Structural Body (S5)

In a sintering step, a sintered body (ceramic body) is obtained by sintering a degreased body.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, a body may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and it may be set at 1550° C. or lower.

The programmed rate of the sintering temperature is not limited specifically, and it may be set at 1° C./hour~500° C./hour, for example.

Sintering a degreased body is conducted under oxygen atmosphere such as atmospheric air, for example.

The duration for sintering a degreased body differs depending on the amount of raw material paste, the type of sintering furnace, the sintering temperature, the sintering atmosphere and the like. It may be set for 10 minutes~24 hours, for example.

Degreasing step (S4) and sintering step (S5) of a body may be conducted in continuous order. Also, by adjusting the duration and programmed rates of temperature in sintering step (S5), a degreasing step (S4) may be included in a sintering step (S5).

Sealing of Through-holes (S6)

In a sealing step, either end of a through-hole of the sintered body in a longitudinal direction is sealed by a sealant to form a sealed body.

Applying a sealant to a sintered body is not limited specifically. For example, an end surface of a sintered body may be immersed into sealant slurry, or sealant may be injected into a through-hole from an end surface of a sintered body using an injector.

As for a sealant, it is not limited to any specific type. For example, raw material paste made of titania particles, alumina particles and a binder ingredient, or other ceramic, may be used.

Sealant slurry is prepared by adding a thermoplastic binder ingredient and a solvent such as water to titania particles and alumina particles, for example. The viscosity of the sealant slurry is adjusted properly according to the type and the like of the sealant. Titania particles and alumina particles may be the same as those used previously to form raw material paste in the preparation step. Also, using the methods described previously in the preparation step, titania particles and alumina particles are brought into contact with each other to form a precursor. Moreover, instead of titania particles and alumina particles, other ceramic particles may also be used for forming sealant slurry. As for a thermoplastic binder ingredient, polybutylene terephthalate, polyphenylene sulfone and the like are listed. As for a solvent, water, ethylene glycol or the like may be used. A surfactant may further be added to sealant slurry. Sealant slurry can be mixed more homogeneously by adding a surfactant. As for a surfactant, organophosphate, carboxylic acid or the like may be used. In addition, a plasticizer may be added to the sealant slurry. By adding a plasticizer, the sealant can better maintain its shape after a sealing step. As for a plasticizer, phthalate ester or the like may be used. A surfactant and a plasticizer may be used for sealant slurry.

Heating of Sealant (S7)

In a sealant heating step, by heating the sealant that has sealed either end of a through-hole of a sintered body in a longitudinal direction, the sealant paste is cured (hardened) and a ceramic honeycomb structure is formed.

In sealant heating step (S7), it is sufficient for sealant paste to be cured (hardened) at an end portion of a through-hole. Sealant paste may be heated until it is sintered, but it is not always necessary for sealant paste to be heated until it is sintered.

As for conditions for heating a sealant, thermal energy is preferred to be set lower than the thermal energy to be provided during a sintering step. Namely, a sealant is preferred to be heated at a lower temperature than that for sintering, or to be heated for a shorter duration. As for conditions for adjusting thermal energy, the difference between the maximum temperature for sintering and the maximum temperature for heating a sealant is preferred to be set in a range of −200° C.~+100° C. or −100° C.~±0° C. relative to the maximum temperature for sintering, for example.

Controlling the temperature for heating a sealant is not limited specifically. It is an option to discontinue heating after the sealant is heated for a predetermined duration.

The programmed rate for heating a sealant is not limited specifically, and it may be 1.5~10 times faster than the programmed rate for a sintering step. Programmed rates of 2~8 times faster, or 3~5 times faster may also be employed. In particular, the programmed rate may be set at 1.5° C./hour~1000° C./hour.

Drying and degreasing steps for a sealant may be included in a sealant heating step. The contents described in drying step (S3) and degreasing step (S4) above may apply as is for drying and degreasing the sealant.

Heating is not limited to any specific method, and may be conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for heating methods, a body may be heated batch by batch or continuously. Alternatively, a body may be settled or circulated while being heated.

Heating a sealant is conducted under an oxygen atmosphere such as atmospheric air, for example.

The duration for maintaining the maximum temperature for heating a sealant differs depending on the amount of sealant paste, the type of sintering furnace, the heating temperature, the heating atmosphere and the like. It may be set for 1 minute to 3 hours, for example, which is preferred to be the same as or shorter than the duration for maintaining the maximum temperature during sintering step (S5).

When heating a sealant, it is an option to heat the entire sintered body sealed with a sealant, or to heat only both end surfaces of a sintered body sealed with a sealant. Also, both end surfaces of a sintered body sealed with a sealant may be simultaneously heated, or may be heated one at a time by heating a first surface followed by heating a second surface.

Figure 5:
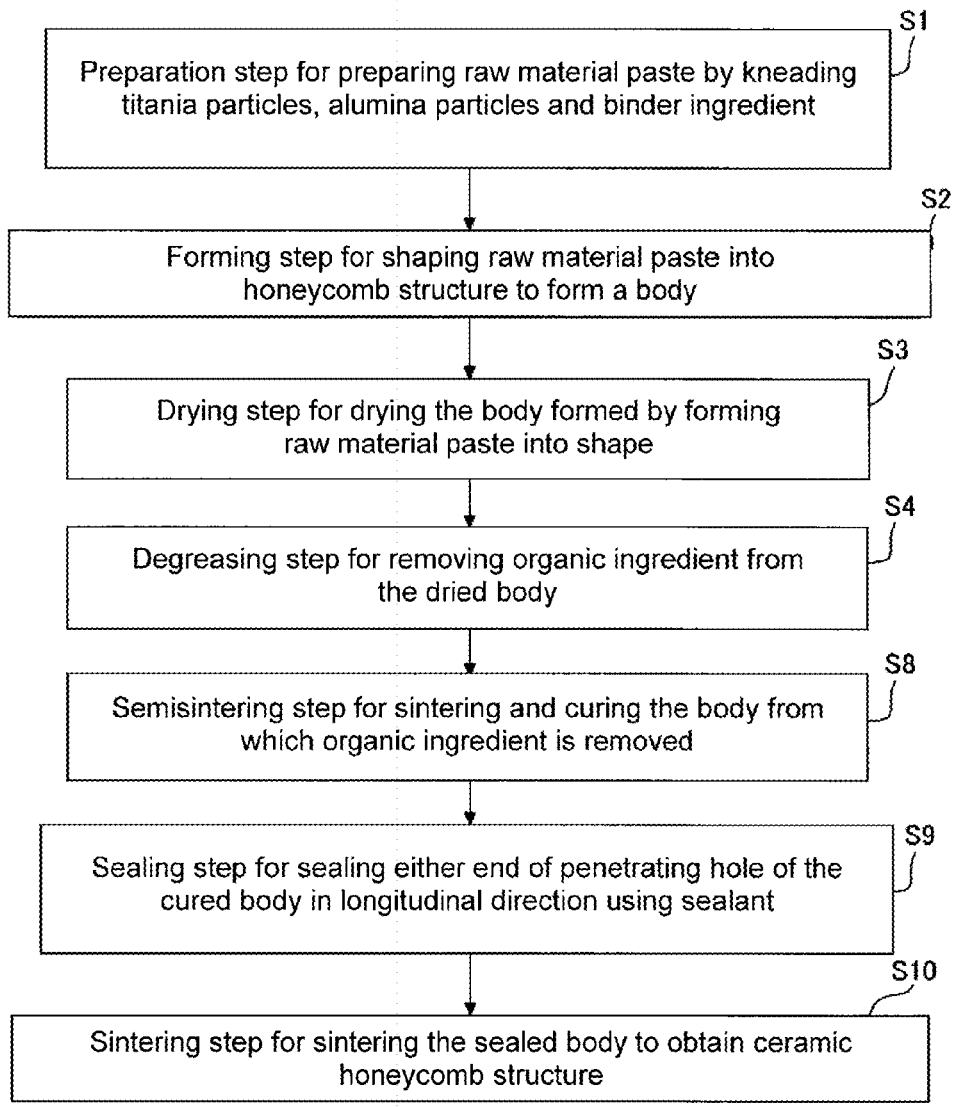
FIG. 5 is a flowchart showing an example of the manufacturing method according to a second embodiment of the present invention.

FIG. 5 is a flowchart showing an example of the method for manufacturing a honeycomb structure according to a second embodiment of the present invention.

As shown in FIG. 5, an example of the method for manufacturing a ceramic honeycomb structure according to the second embodiment includes the following: preparation step (S1) for preparing raw material paste by kneading titania particles, alumina particles and a binder ingredient; forming step (S2) for shaping the raw material paste into a honeycomb structure to form a body; drying step (S3) for drying the body shaped from the raw material paste; degreasing step (S4) for removing organic ingredients from the dried body; semisintering step (S8) for heating and curing the body from which organic ingredients are removed; sealing step (S9) for sealing either end of a through-hole of the cured body in a longitudinal direction using a sealant; and sintering step (S10) for sintering the sealed body to obtain a ceramic honeycomb structure.

However, it is an option to include drying step (S3) and degreasing step (S4) in a method for manufacturing a ceramic honeycomb structure.

The method for manufacturing a ceramic honeycomb structure according to the second embodiment is not limited to that of the first embodiment. It is an option to first conduct semisintering step (S8) for heating a degreased body, and then to conduct sealing step (S9) for sealing either end of a through-hole of the semisintered body in a longitudinal direction using a sealant, which is then followed by sintering step (S10) for sintering the sealed body.

Accordingly, the difference is reduced between the diameter at both ends of a ceramic body in a longitudinal direction and the diameter at the center. Also, when a method for manufacturing a ceramic honeycomb structure includes degreasing step (S4), a body is sufficiently degreased without setting a higher degreasing temperature or a longer degreasing duration.

In the following, semisintering step (S8), sealing step (S9) and sintering step (S10) are described. The contents described above apply as is to preparation step (S1), preconditioning treatment step, forming step (S2), drying step (S3) and degreasing step (S4) here.

Semisintering of Honeycomb Structural Body (S8)

In a semisintering step, a body from which organic ingredients are removed is heated.

In a semisintering step, it is sufficient to heat a body to such a degree that the body can maintain its shape. However, it is preferred if the sintering contraction has progressed further.

Semisintering is not limited to any specific method, and may be conducted using a sintering furnace such as an electric tube furnace, electric box furnace, tunnel kiln, far infrared furnace, microwave heater, shaft kiln, reverberatory furnace, rotary-hearth furnace or roller-hearth furnace.

A body may be semisintered batch by batch or continuously. Alternatively, a body may be settled or circulated while being semisintered.

The semisintering temperature is 1000° C. or higher, for example, and it may be set at 1100° C. or higher. In addition, the semisintering temperature is 1650° C. or lower, for example, and it may be set at 1550° C. or lower.

The programmed rate of the semisintering temperature is not limited specifically, and it may be set at 1° C./hour~500° C./hour, for example.

Semisintering a body is conducted under oxygen atmosphere such as atmospheric air, for example.

The duration for maintaining the maximum temperature for semisintering a body differs depending on the amount of raw material paste, the type of sintering furnace, the semisintering temperature, the sintering atmosphere and the like. It may be set for 1 minute to an hour, for example.

Degreasing step (S4) and semisintering step (S8) of a body may be conducted consecutively.

Sealing of Semisintered Body (S9)

In a sealing step, either end of a through-hole of a semisintered body in a longitudinal direction is sealed with a sealant.

Applying a sealant to a semisintered body is not limited specifically. For example, an end surface of a body may be immersed into sealant slurry, a sealant may be injected into a through-hole from an end surface using an injector, and the like.

As for a sealant, it is not limited to any specific type. For example, raw material paste made of titania particles, alumina particles and a binder ingredient, or made of other ceramic, may be used.

Sealant slurry is prepared by adding a binder ingredient and a solvent such as water to ceramic particles such as titania particles and alumina particles, for example. The viscosity of the sealant slurry is adjusted properly according to the type and the like of the sealant. The sealant slurry used for the first embodiment may also be used here. When sealant slurry is used in the second embodiment for conducting a sealing step before sintering, ratios of combining a binder, solvent, plasticizer or surfactant may be set higher than those in the first embodiment. That is because it is easy to degrease in a subsequent sintering step.

Sintering of Sealed Body (S10)

In a sintering step, a ceramic honeycomb structure is obtained by sintering a sealed body.

Sintering is not limited to any specific method, and may be conducted using a sintering furnace such as an electric tube furnace, electric box furnace, tunnel kiln, far infrared furnace, microwave heater, shaft kiln, reverberatory furnace, rotary-hearth furnace or roller-hearth furnace.

Sintering may be conducted batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and it may be set at 1550° C. or lower.

The programmed rate of the sintering temperature is not limited specifically, and it may be set at 1° C./hour~500° C./hour, for example.

Sintering a sealed body is conducted under oxygen atmosphere such as atmospheric air, for example.

The duration for sintering a sealed body differs depending on the amount of raw material paste, the type of sintering furnace, the sintering temperature, the sintering atmosphere and the like. It may be set for 10 minutes~24 hours, for example.

When the sealed body is sintered in sintering step (S10), the sealant that has sealed the body is also sintered.

Ceramic Honeycomb Structural Body

A ceramic honeycomb structure according to an embodiment of the present invention is obtained by a method for manufacturing a ceramic honeycomb structure that includes the following: a preparation step for preparing raw material paste by kneading titania particles, alumina particles and a binder ingredient; a forming step for shaping the raw material paste into a honeycomb structure to form a body having through-holes and partitions; a sintering step for sintering the body; a sealing step for sealing either end of a through-hole of the sintered body in a longitudinal direction using a sealant; and a sealant heating step for sintering the sealant which has sealed either end of a through-hole of the sintered body in a longitudinal direction to obtain a ceramic honeycomb structure.

A ceramic honeycomb structure according to another embodiment of the present invention is obtained by a method for manufacturing a ceramic honeycomb structure that includes the following: a preparation step for preparing raw material paste by kneading titania particles, alumina particles and a binder ingredient; a forming step for shaping the raw material paste into a honeycomb structure to form a body having through-holes and partitions; a semisintering step for heating and curing the body; a sealing step for sealing either end of a through-hole of the cured body in a longitudinal direction using a sealant; and a sintering step for sintering the sealed body to obtain a ceramic honeycomb structure.

When an element analysis is performed on the obtained ceramic body using a scanning electron microscope (S-4800, Hitachi, Ltd.) and an energy dispersive X-ray spectrometer (EMAX Energy EX-250, Horiba, Ltd.), the ratio (weight ratio) of titania and alumina in a ceramic body is preferred to be in a range of 7:10~4:10, more preferably in a range of 6:10~5:10.

In addition, it is preferred that titania be contained at 15 wt. %~50 wt. % and alumina at 45 wt. %~70 wt. % of the entire weight of the obtained ceramic body; more preferably, titania at 22 wt. %~40 wt. % and alumina at 55 wt. %~65 wt. %. Furthermore, it is preferred to contain silica at 1 wt. %~20 wt. % of the entire weight of the obtained ceramic body, more preferably 3 wt. %~15 wt. %.

Partitions of a ceramic honeycomb structural body can function as a filter to capture particulate matter (PM) or the like.

Therefore, a ceramic honeycomb structure can function, for example, as a diesel particulate filter (DPF) or the like.

EXAMPLES

The present invention is further described in detail by the following examples. However, the present invention is not limited to such examples.

Example 1

Eight parts by weight of titania particles with a mean volume particle diameter of 12 μm (brand name $TiO_2$ 3020 (registered trademark), Kronos Incorporated), 10 parts by weight of alumina particles with a mean volume particle diameter of 3 μm (brand name $Al_2O_3$ RMA (registered trademark), Alcan Inc.), and 40 parts by weight of water are placed into a spray dryer (G8210-A, Yamato Scientific Co., Ltd.) and spray dried to form a precursor.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The raw material paste is extruded through a honeycomb die to form a honeycomb structural body having approximately 300 cpsi (approximately 46.5 cell/$cm^2$) with a partition thickness of approximately 0.010 inch (approximately 0.25 mm). The raw material paste is shaped into a body with a diameter of 143.8 mm and a length of 150 mm.

Then, a body is cut to a length and dried for 20 minutes using both microwave (2.45 GHz, 20 kW) and hot air (140° C., air speed of 1 m/s).

Then, the body is semisintered for 3 hours at 500° C., and kept for one minute at a maximum temperature of 1350° C.

Next, using the same raw material paste used for a honeycomb body, sealant slurry is prepared.

Masking film is placed on both end surfaces of a semisintered body. Then, holes are formed in the masking films to make a checkered pattern so that the ceramic honeycomb structural body obtained after sintering is sealed in checkered patterns which are complementary on one end surface and on the other end surface of the ceramic body. Accordingly, a masked body is formed. As for masking film, a tape with an adhesive layer (adhesive force of 5.3 N/cm) made by forming acrylic adhesive on a polyester base is used.

The portion from an end sealed with masking film to a point 5 mm upward in a longitudinal direction of a semisintered body is immersed into sealant slurry. Then, the body is lifted from the sealant slurry. In the same manner, the other end of the body in a longitudinal direction is also immersed into the sealant slurry and lifted from the sealant slurry to obtain a sealed body. Then, the sealed body is sintered by keeping it for four hours at a maximum temperature of 1450° C. Accordingly, a ceramic honeycomb structural body is obtained.

An element analysis is performed on the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found in a range of 6:10~5:10.

Example 2

Raw material paste is prepared the same as in Example 1, and a body is formed by shaping the raw material paste.

Then, the body is dried for 20 minutes using both microwave (2.45 GHz, 20 kW) and hot air (140° C., air speed of 1 m/s), degreased for 3 hours at 500° C., and sintered for 4 hours at 1450° C. to form a ceramic body.

The same as in Example 1, masking film is placed on both end surfaces of the ceramic body. By the same method as that in Example 1, sealant slurry is used to seal either end of a through-hole of the ceramic body in a longitudinal direction to form a sealed body.

Then, both end surfaces of the sealed body are kept at a maximum temperature of 1350° C. for one minute to sinter the sealant. Accordingly, a ceramic honeycomb structural body is obtained.

Comparative Example 1

Raw material paste is prepared the same as in Example 1, and a body is formed by shaping the raw material paste.

The same as in Example 1, masking film is placed on both end surfaces of the ceramic body. By the same method as that in Example 1, sealant slurry is used to seal either end of a through-hole of the ceramic body in a longitudinal direction to form a sealed body.

Then, the sealed body is degreased for 4 hours at 550° C., and sintered for 4 hours at 1450° C. to form a ceramic honeycomb structural body.

Evaluation

Ceramic bodies obtained in Example 1, Example 2 and Comparative Example 1 are observed, and diameters at both ends in a longitudinal direction and diameters of central portions are measured.

As a result, compared with a ceramic body obtained in Comparative Example 1, it is found that ceramic bodies obtained in Examples 1 and 2 have smaller differences in the diameters of each portion and that the degree of contraction of each portion is substantially the same.

In addition, compared with the ceramic body obtained in Comparative Example 1, organic ingredients near the sealant are efficiently removed from ceramic bodies obtained in Examples 1 and 2 despite a lower degreasing temperature and a shorter degreasing duration.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:
    kneading titania particles, alumina particles and a binder ingredient such that a raw material paste comprising the titania particles, the alumina particles and the binder ingredient is prepared;
    forming a body comprising the raw material paste and having a honeycomb structure such that the body has the honeycomb structure having a plurality of through-holes extending in a longitudinal direction of the body and a plurality of partition portions formed between the through-holes;
    sintering the body comprising the raw material paste and having the honeycomb structure at a temperature in a range of from 1350° C. to 1650° C. such that a ceramic body comprising aluminum titanate and having the honeycomb structure is formed;
    applying a sealant comprising titania particles and alumina particles to one end of each of the through-holes of the ceramic body in the longitudinal direction such that each of the through-holes of the ceramic body is sealed at the one end; and
    heating the sealant sealing the one end of each of the through-holes of the ceramic body at a temperature which is 1000° C. or higher and lower than the temperature of the sintering of the body such that the ceramic body having a cured sealant at the one end of each of the through-holes in the honeycomb structure is formed without sintering the cured sealant at the one end of each of the through-holes in the honeycomb structure,
    wherein the heating of the sealant comprises heating both end surfaces of the ceramic body.

2. The method for manufacturing a ceramic honeycomb structure according to claim 1, further comprising drying the body comprising the raw material paste and having the honeycomb structure.

3. The method for manufacturing a ceramic honeycomb structure according to claim 1, further comprising degreasing the body comprising the raw material paste and having the honeycomb structure such that an organic ingredient in the raw material paste of the body is removed.

4. The method for manufacturing a ceramic honeycomb structure according to claim 1, further comprising forming a precursor comprising particles comprising titania particles and alumina particles, wherein the kneading comprises kneading the binder ingredient and the particles of the precursor comprising the titania particles and the alumina particles.

5. The method for manufacturing a ceramic honeycomb structure according to claim 4, wherein the forming of the precursor comprises spray-drying the alumina particles onto the titania particles.

6. The method for manufacturing a ceramic honeycomb structure according to claim 1, wherein the heating of the sealant comprises heating the sealant at a temperature of 1100° C. or higher and lower than the temperature of the sintering of the body.

7. The method for manufacturing a ceramic honeycomb structure according to claim 3, further comprising drying the body comprising the raw material paste and having the honeycomb structure.

8. The method for manufacturing a ceramic honeycomb structure according to claim 5, further comprising degreasing the body comprising the raw material paste and having the honeycomb structure such that an organic ingredient in the raw material paste of the body is removed.

9. The method for manufacturing a ceramic honeycomb structure according to claim 7, further comprising forming a precursor comprising particles comprising titania particles and alumina particles, wherein the kneading comprises kneading the binder ingredient and the particles of the precursor comprising the titania particles and the alumina particles.

10. The method for manufacturing a ceramic honeycomb structure according to claim 9, wherein the forming of the precursor comprises spray-drying the alumina particles onto the titania particles.

11. The method for manufacturing a ceramic honeycomb structure according to claim 5, wherein the heating of the sealant comprises heating the sealant at a temperature of 1100° C. or higher and lower than the temperature of the sintering of the body.

12. The method for manufacturing a ceramic honeycomb structure according to claim 4, wherein the heating of the sealant comprises heating the sealant at a temperature of 1100° C. to or higher and lower than the temperature of the sintering of the body.

13. The method for manufacturing a ceramic honeycomb structure according to claim 4, further comprising drying the body comprising the raw material paste and having the honeycomb structure.

14. The method for manufacturing a ceramic honeycomb structure according to claim 4, further comprising degreasing the body comprising the raw material paste and having the honeycomb structure such that an organic ingredient in the raw material paste of the body is removed.

15. The method for manufacturing a ceramic honeycomb structure according to claim 9, wherein the heating of the sealant comprises heating the sealant at a temperature of 1100° C. or higher and lower than the temperature of the sintering of the body.

16. The method for manufacturing a ceramic honeycomb structure according to claim 6, further comprising drying the body comprising the raw material paste and having the honeycomb structure.

17. The method for manufacturing a ceramic honeycomb structure according to claim 6, further comprising degreasing the body comprising the raw material paste and having the honeycomb structure such that an organic ingredient in the raw material paste of the body is removed.

18. The method for manufacturing a ceramic honeycomb structure according to claim 10, wherein the heating of the sealant comprises heating the sealant at a temperature of 1100° C. or higher and lower than the temperature of the sintering of the body.

19. The method for manufacturing a ceramic honeycomb structure according to claim 13, wherein the heating of the sealant comprises heating the sealant at a temperature of 1100° C. or higher and lower than the temperature of the sintering of the body.

20. The method for manufacturing a ceramic honeycomb structure according to claim 14, wherein the heating of the sealant comprises heating the sealant at a temperature of 1100° C. or higher and lower than the temperature of the sintering of the body.

* * * * *